June 1, 1954 J. E. A. NIXON 2,680,149

CIRCUIT FOR MAINTAINING CONSTANT POTENTIAL AT LINE AND FRAME SYNC PEAKS

Filed Aug. 17, 1951 3 Sheets-Sheet 1

Inventor:
John Esmonde Arthur Nixon;
By his attorneys,
Baldwin & Wight

Inventor:
John Esmonde Arthur Nixon;
By his attorneys,
Baldwin & Wright

INVENTOR
John Esmonde Arthur Nixon
BY HIS ATTORNEYS
Baldwin & Wight

Patented June 1, 1954

2,680,149

UNITED STATES PATENT OFFICE 2,680,149

CIRCUIT FOR MAINTAINING CONSTANT POTENTIAL AT LINE AND FRAME SYNC. PEAKS

John Esmonde Arthur Nixon, Colchester, England, assignor to Marconi's Wireless Telegraph Company Limited, London, England, a company of Great Britain Application August 17, 1951, Serial No. 242,212

Claims priority, application Great Britain August 22, 1950

5 Claims. (Cl. 178—7.3)

This invention relates to inter-stage couplings for television and the like systems, and particularly to resistance-capacity couplings.

In resistance-capacity inter-stage couplings for television, it is usual to employ a diode for maintaining the potential attained at the peak of synchronizing pulses (so-called sync. bottom) at a constant value.

The invention is illustrated, and further discussed, in connection with the accompanying drawings, in which.

Figure 1:
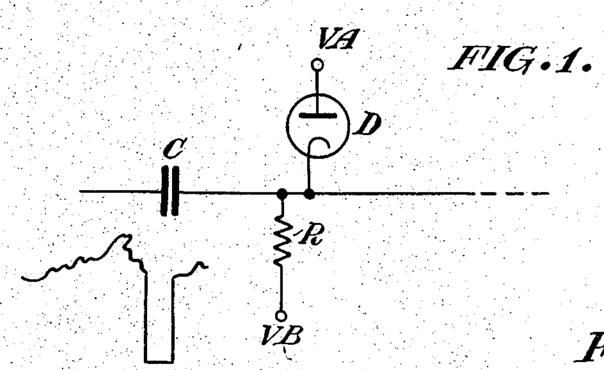
Figs. 1 and 2 illustrate known circuit arrangements.

Fig. 1 of the accompanying drawings shows one known arrangement in which the coupling circuit comprises a condenser C in series with a resistance R, input being applied from one stage (not shown) across these series connected elements and output to the next stage (not shown) being taken from across the resistance. A diode D is connected between the junction of the condenser with the resistance in the resistance-capacity coupling and a point VA of fixed potential on the remote side of the diode. The potential at VA is adjusted to a value dependent upon the level to which it is desired that the sync. pulses should return, line by line. The potential difference between VA and VB is made large compared with the signal amplitude on condenser C and of such sense as to tend to cause current to flow through diode D.

Figure 2:
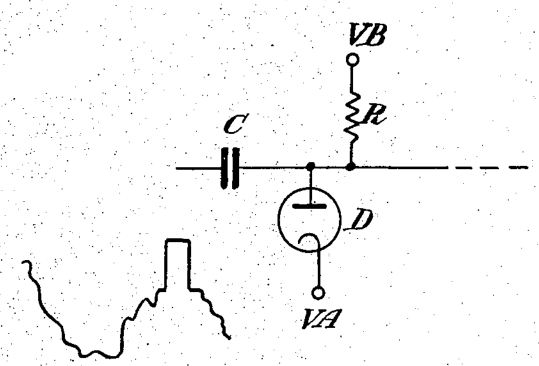

Fig. 2 of the accompanying drawing also shows a known arrangement and is similar to that of Fig. 1 except that the diode D and potential between VA and VB are oppositely poled, so as to deal with an inverted television signal.

The diode in each case, tends to remove, pulse by pulse, the charge built up on the condenser in the resistance-capacity coupling by current flowing through the resistance of the coupling.

Figure 3:
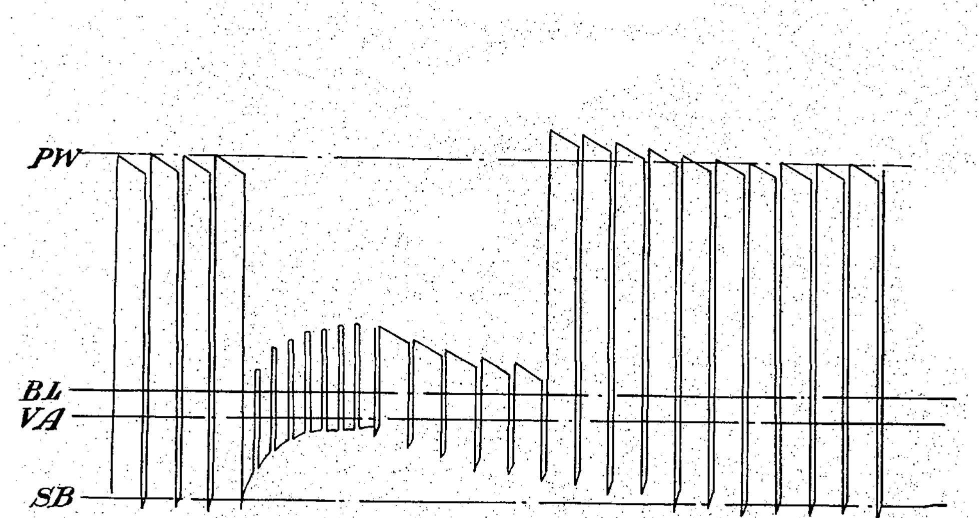
Fig. 3 is a graph illustrating a defect in the known arrangements.

Unless the signal applied to the condenser C is of large amplitude, the potential to which the condenser returns, line by line at sync. bottom, will differ from the potential at the point VA of fixed potential by an amount which is a large percentage of the signal amplitude. However, during frame synchronizing periods, the diode D is conductive for the greater part of the time, and the difference between the potential of the condenser and that of the point VA of fixed potential will be greatly reduced and the wave form will be distorted, as indicated in Fig. 3 of the accompanying drawings in which PW indicates peak white, BL indicates black level, VA indicated the potential at points VA in Figs. 1 and 2, and SB indicates sync. bottom.

Couplings such as those illustrated in Figs. 1 and 2 are, for the purpose of the present invention, inter-stage couplings of the kind referred to.

The present invention aims at reducing, in inter-stage couplings of the kind referred to, the distortion above referred to and to maintain sync. bottom constant over frame and line periods, and according to the invention, means are provided for applying to the remote side of the diode during frame synchronizing periods, potentials of different value from those applied during the remainder of a frame cycle.

A preferred means for effecting this consists in the provision of an additional condenser, of small capacity compared with that of the condenser in the resistance-capacitor coupling, connected to the remote side of the diode.

Means are provided for discharging the additional condenser at the same rate that the current in the R. C. resistance charges the condenser of the resistance-capacity coupling.

Figure 4:
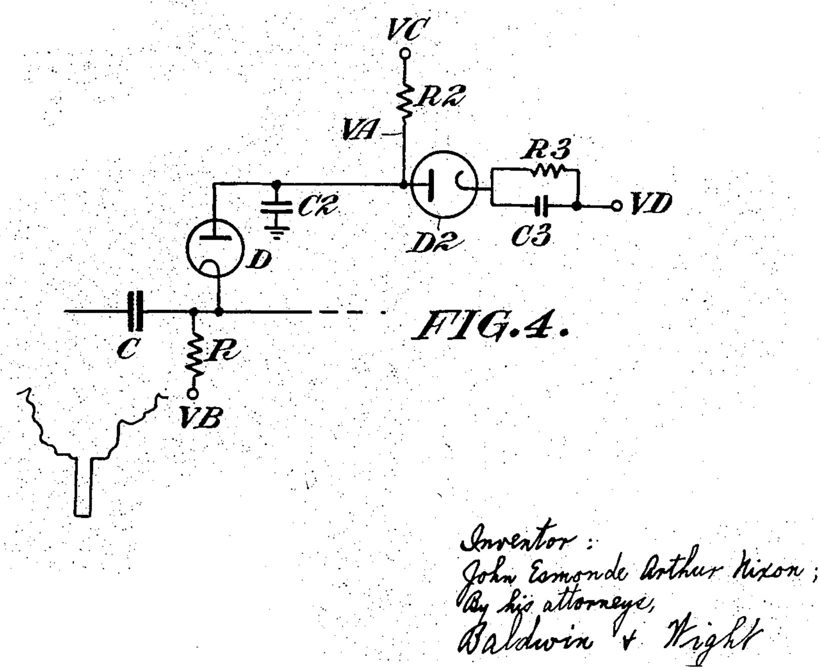
Fig. 4 shows the invention applied to the circuit in Fig. 1.

A practical resistance-capacity coupling circuit according to the invention, applied to a system in which synchronizing pulses are negative going and in the blacker than black direction (the case envisaged in Fig. 1) is illustrated in Fig. 4 of the accompanying drawings. It comprises the usual condenser C in series with the usual resistance R across which series-connected elements the input signal is applied and from the resistance in which output is taken. To the point of juncture of the condenser C and resistance R, the cathode of a diode D is connected, the anode of the diode being connected through a second resistance R2 to the positive terminal VC of a source of potential many times greater than the variation in potential required to be established at the anode of the diode D. The value of the resistance between the anode of the diode and the positive terminal of the source is adjusted or selected, having regard to the value of the positive potential, to carry slightly more current than does the resistance R. Connected to the point of juncture of the anode of the diode with the resistance R2 is a condenser C2 whose capacity is as small as possible consistent with the requirement that it must ensure that the change in voltage during line sync. pulse, at the anode of the diode D is small compared with the amplitude of the signal, otherwise, the line sync. pulse bottom will be distorted. The other side of the small condenser C2 is earthed.

A second diode D2 has its anode connected to the anode of diode D, that is to the point of juncture of the anode of diode D with the small condenser C2 and the resistance R2, the cathode of the second diode being connected to one side of a circuit element comprising a third resistance R3 in parallel with a third condenser C3, the other end of this circuit element being connected to the positive terminal VD of a source of potential. This last mentioned potential is variable so as to enable the potential VA at the anodes of the diodes to be adjusted to a desired value. The third condenser C3 will charge to the difference between the value of the potential VA at the diode anodes and that of the variable potential VD so as to serve as a buffer, when the second diode conducts, to maintain the potential VA at the anode of diode D at or below the value it assumes after a sequence of line sync. pulses. During the frame-pulse period the charge in condenser C has changed (though to a less extent that it would have done if C2 were absent). Consequently, during subsequent lines, the transfer of charge from condenser C2 to condenser C is less than it would otherwise be, and C2 would, but for the presence of diode D2, overcharge. Condenser C3 and resistance R3 improve this effect in the following manner. As has been indicated, during frame pulse periods, condenser C2 largely discharged and diode D2 is rendered non-conductive. Consequently condenser C3 discharges through resistance R3 and, if the time-constant of these elements has been correctly chosen, the potential developed across diode D2, when condenser C2 is discharging at the end of the frame-pulse period is equal to the drop of potential experienced by condenser C3 during the frame-pulse period. Thus, the potential VA, which is the sum of these two potentials is limited in the desired manner.

If desired, though this is not the preferred arrangement the variable positive potential may be connected directly to the cathode of the second diode D2.

The current in the resistance R of the resistance-capacity coupling must be kept as constant as possible as is already usual in simple "restored" couplings. This is effected by returning resistance R to a source of potential of such a sense as to tend to keep the restoring diode D conducting; the magnitude of the potential drop so developed across the resistance being many times greater than the signal amplitude.

Figure 6:
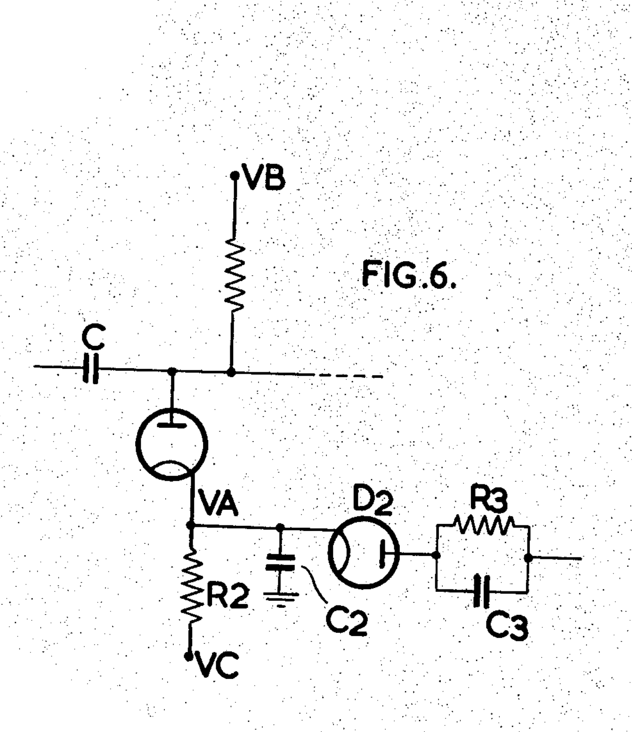
Fig. 6 shows the invention applied to the circuit of Fig. 2.

If the synchronizing signals are positive going, the two diodes must be reversed, and the D. C. potentials VB and VC to which the resistances R and R2 are connected must be adjusted accordingly. This is illustrated in Fig. 6.

Figure 5A:
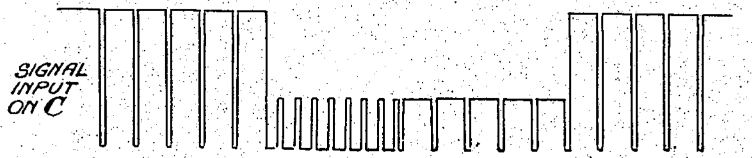
Fig. 5 (*a*, *b* and *c*) is a series of graphs relating to the arrangement of Fig. 4.
Figure 5B:
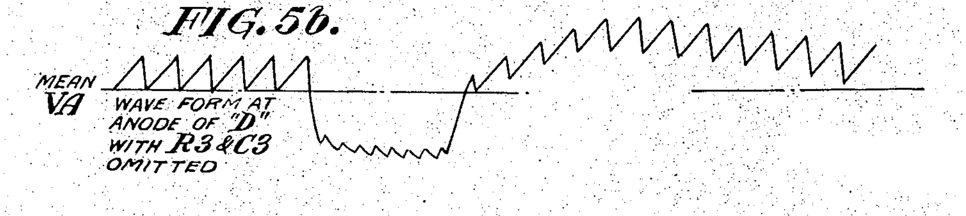
Figure 5C:
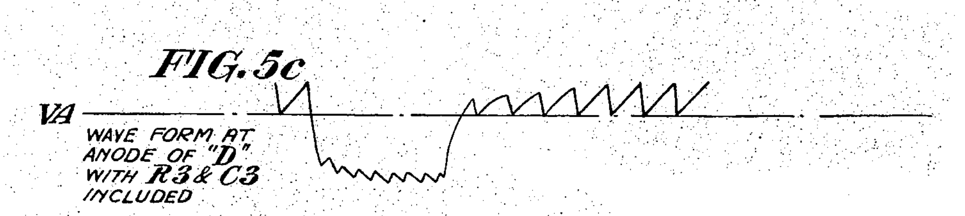

Figs. 5*a*, 5*b* and 5*c* of the accompanying drawing are graphs showing respectively the signal input on condenser C of Fig. 4, the wave form at the anode of diode D with R3 and C3 omitted, and the wave form at the anode of diode D with R3 and C3 included. The overshoot in Fig. 5*b* is eliminated in Fig. 5*c* by the limiting action of the diode D2 in conjunction with resistances R3 and condenser C3.

I claim:

1. An inter-stage coupling for use in television systems, comprising a first condenser and a first resistance connected in series, a connection connecting the free end of said resistance to one terminal of a source of potential, connections for applying television signals across said series-connected first condenser and first resistance, connections for taking output signals from across said first resistance, a first diode, a second resistance, connections connecting said first diode and said second resistance in series between the other terminal of said source of potential and the point of juncture of said first condenser with said first resistance the sense of connection being such as to tend to cause said first diode to conduct, a second condenser of small capacity connected to the point of juncture of said first diode with said second resistance, a second diode, a third condenser and a third resistance connected in parallel with each other, one terminal of an adjustable source of potential, and connections connecting said third diode and said parallel-connected third condenser and third resistance between the last mentioned point of juncture and said one terminal of said adjustable source of potential, the whole arrangement being such that the change of potential at said last mentioned point of juncture is small compared with the amplitude of the signal.

2. An inter-stage coupling for use in television systems comprising a first condenser and a first resistance connected in series, a connection connecting the free end of said resistance to the negative terminal of a source of potential, connections for applying television signals across said series-connected first condenser and first resistance, connections for taking output signals from across said first resistance, a first diode, having an anode and a cathode, connections connecting said cathode to the point of juncture of said first condenser with said first resistance, a second resistance, connections connecting said anode and said second resistance in series to the positive terminal of said source of potential, a second condenser of small capacity connected between the point of juncture of said anode with said second resistance and earth, a second diode having an anode and a cathode, connections connecting the anodes of said first and second diodes together, a negative terminal of an adjustable source of potential, a connection connecting the cathode of said second diode to said negative terminal.

3. An inter-stage coupling according to claim 2 wherein said last mentioned connection includes a third condenser connected in parallel with a third resistance.

4. An inter-stage coupling for use in television systems comprising a first condenser and a first resistance connected in series, a connection connecting the free end of said resistance to the positive terminal of a source of potential, connections for applying television signals across said series-connected first condenser and first resistance, connections for taking output signals from across said first resistance, a first diode having an anode and a cathode, connections connecting said anode to the point of juncture of said first condenser with said first resistance, a second resistance, connections connecting said cathode and said second resistance in series to the negative terminal of said source of potential, a second condenser of small capacity connected between the point of juncture of said cathode with said second resistance and earth, a second diode having an anode and a cathode, connections connecting the cathodes of said first and second diodes together, a positive terminal of an adjustable source of potential, a connection connecting said anode of said second diode to said positive terminal.

5. An inter-stage coupling according to claim 4 wherein said last mentioned connection includes a third condenser connected in parallel with a third resistance.

References Cited in the file of this patent

UNITED STATES PATENTS

| Number | Name | Date |
|---|---|---|
| 2,294,341 | Moore | Aug. 25, 1942 |
| 2,466,959 | Moore | Apr. 12, 1949 |
| 2,500,839 | Lord | Mar. 14, 1950 |
| 2,598,929 | Moore | June 3, 1952 |